United States Patent
Schade (10) Patent No.: US 6,618,784 B1
(45) Date of Patent: Sep. 9, 2003

(54) UNIVERSAL MEMORY BUS AND CARD

(75) Inventor: Peter Arthur Schade, Milpitas, CA (US)

(73) Assignee: International Microsystems, Inc., Milpitas, CA (US)

( * ) Notice: Subject to any disclaimer, the term of this patent is extended or adjusted under 35 U.S.C. 154(b) by 0 days.

(21) Appl. No.: 09/539,161

(22) Filed: Mar. 29, 2000

Related U.S. Application Data (62) Division of application No. 08/903,233, filed on Jul. 18, 1997, now Pat. No. 6,067,593.
(60) Provisional application No. 60/039,744, filed on Mar. 3, 1997.

(51) Int. Cl.[7] .................... G06F 13/14; G06F 13/12; G06F 13/00
(52) U.S. Cl. ................. 710/305; 710/8; 710/63; 710/74; 713/100; 711/115
(58) Field of Search .............. 710/104, 52; 711/156, 711/1, 2, 103; 712/1; 714/7, 766; 257/678; 365/189.09

(56) References Cited

U.S. PATENT DOCUMENTS

| | | | | |
|---|---|---|---|---|
| 4,156,926 A | * | 5/1979 | Hartman ............... 711/103 |
| 4,757,439 A | * | 7/1988 | Stinson et al. ......... 711/156 |
| 4,951,248 A | * | 8/1990 | Lynch .................... 711/2 |
| 5,361,373 A | * | 11/1994 | Gilson .................... 712/1 |
| 5,565,704 A | * | 10/1996 | Tokuno ................ 257/678 |
| 5,628,028 A | * | 5/1997 | Michelson ............ 710/104 |
| 5,696,917 A | * | 12/1997 | Mills et al. ............ 711/1 |
| 5,732,406 A | * | 3/1998 | Bassett et al. ......... 711/1 |
| 5,758,056 A | * | 5/1998 | Barr ..................... 714/7 |
| 5,831,890 A | * | 11/1998 | Selna et al. ........ 365/189.09 |
| 5,877,975 A | * | 3/1999 | Jigour et al. ........... 365/244 |
| 5,923,682 A | * | 7/1999 | Seyyedy ................ 714/766 |
| 5,946,276 A | * | 8/1999 | Ridges et al. ........... 710/52 |

* cited by examiner

*Primary Examiner*—Mark H. Rinehart
*Assistant Examiner*—Christopher E. Lee
(74) *Attorney, Agent, or Firm*—Sawyer Law Group LLP (57) ABSTRACT

A universal memory bus coupled between a system's CPU and the system memory is composed of four channels; a primary channel, an identification channel, a programming channel and an expansion channel. The primary channel communicates operating system data necessary to boot the system. The identification channel communicates signals describing the device composition of the system memory. The programming channel communicates programming signals to all of the programmable memory devices within the system memory and thus allows complete programmability of those devices. The expansion channel provides data and programming access to a memory device subsequently added to the system memory.

6 Claims, 6 Drawing Sheets

UNIVERSAL MEMORY BUS AND CARD

STATEMENT OF RELATED APPLICATIONS

The present application is a Divisional of U.S. Ser. No. 08/903,233, filed on Jul. 1, 1997, now U.S. Pat. No. 6,067,593.

This application claims the benefit of U.S. Provisional Application No. 60/039,744 filed Mar. 3, 1997, the disclosure of which is herein incorporated by reference.

BACKGROUND OF THE INVENTION

This invention relates generally to a memory bus architecture, and in particular to a single memory bus capable of communicating data and programming signals to an expandable and reconfigurable system memory.

Modern electronic computer systems utilize memory to store instructions and data which are necessary to make the computer function properly. The memory which stores instructions and data is referred to as system memory. System memory is often made up of a mix of different memory types to fulfill a variety of requirements. One common memory type is programmable read only (PROM) memory. PROM memory is often used to store the initial code for starting the computer, commonly referred to as boot code. Another common memory type is dynamic random access (DRAM) memory. DRAM memory provides fast data storage and retrieval times and is commonly used to during computer operation. A third type of memory is referred to as disk memory. Disk memory typically provides a very large storage space and is used to store the programs that are loaded into the DRAM memory as well as other large blocks of computer information. A fourth type of memory is serial memory. Serial memory is often used to store the last state of the computer system and therefore is not required to be large in size or fast in execution.

The various elements of system memory are normally placed in different physical locations in the computer system.

For instance, the PROM and serial memory may be in semiconductor devices placed on the same board next to the host computer central processing unit (CPU). DRAM memory may reside on removable cards called DIMM or SIMM modules that are then inserted into sockets physically near the CPU. The disk memory may be in a semi-removable enclosure physically separated some distance from the CPU.

Figure 1:
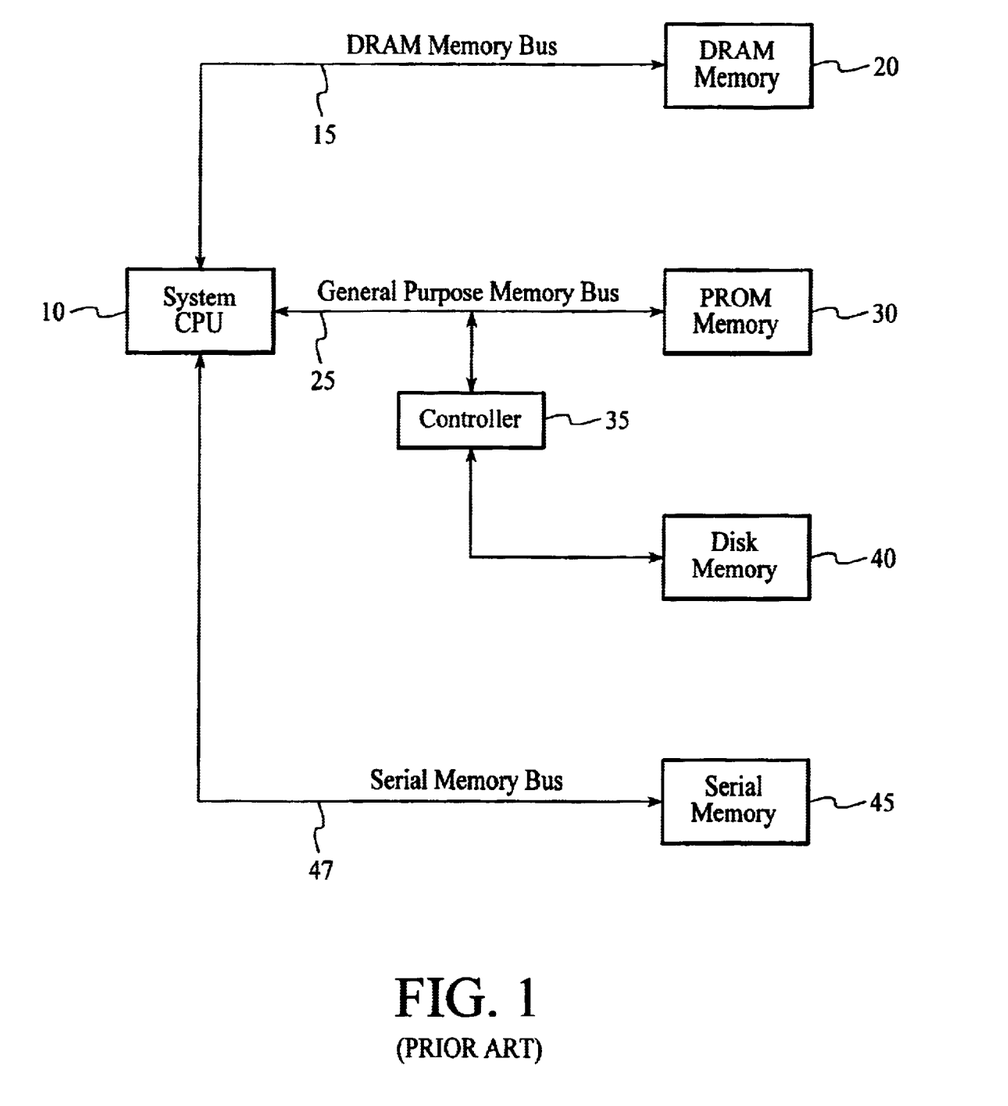
FIG. 1 is a multiple memory bus architecture known in the art.

Data is communicated between the CPU and the system memory over one or more memory buses. One known bus architecture uses separate buses, each connected to a different memory type within the system memory. As shown in FIG. 1, a general purpose memory bus 25 connects the CPU 10 to the PROM memory 30, while a high speed DRAM bus 15 connects the CPU 10 to the DRAM memory 20. The CPU 10 may be connected to its disk memory 40 indirectly through a controller 35 which itself is connected to the general purpose system bus 25. The CPU 10 may be connected to the serial memory 45 using a serial bus 47.

Typically, each bus has a protocol which defines how information is communicated between the CPU and the connected memory device. The general purpose bus 25, for instance, may employ a protocol which requires transmission of acknowledgment signals between the CPU and the system memory as an indication that the desired data has been received. In contrast, the bus connecting the CPU and DRAM memory may not require acknowledgment signals which, in some cases, tend to slow down data transfer.

The multiple memory bus architecture of FIG. 1 provides the advantages of reliable and fast data transfer through the use of dedicated memory buses. However, the multiple bus architecture is costly since its implementation often requires redundant use of the CPU signal lines and multiple connectors to the various memory devices. Further, because each memory type may employ some programmable memory devices and each memory type is accessed through separate bus lines requiring different protocols, programming these memory devices is often complicated and time consuming.

What is needed is a single memory bus architecture which can carry data and provide programming access to each memory device used within the system memory. Further advantageous would be a single memory bus which could accommodate additional or different types of memory devices subsequently added to the system memory. Providing the attributes of data and programming accessibility over a single memory bus enables the placement of the entire system memory on one or more physically and electrically similar universal memory cards. With the system memory residing on universal memory card(s), the user can easily configure the initial system memory and, if the need arises, reconfigure or upgrade the system memory to meet future system memory requirements.

SUMMARY OF THE INVENTION

The present invention provides a universal memory bus for communicating data and providing programming access to all memory devices within the system memory. In one embodiment the universal memory bus includes a primary channel for communicating operating system data from the system memory to the host system CPU, an identification channel for communicating data describing the device composition of the system memory, and a programming channel for communicating programming signals between the system memory and the host system CPU. In another embodiment, the universal memory bus further includes an expansion channel for communicating data and programming signals to a memory device subsequently added to the system memory. The universal memory bus provides complete data and programming accessibility to the system memory along with a memory expansion capability to accommodate subsequently added memory devices.

The present invention also provides for a universal memory card herein referred to as an X-Card. The universal memory card includes a circuit board having numerous electrical contact points, an on-card system memory coupled to the electrical contact points, whereby the on-card system memory uses a first memory device to store operating system data, and a definition device to store identification data describing the device composition of said on-card system memory. The universal memory card additionally includes a single memory bus having a primary channel consisting of a first group of the electrical contact points for communicating the operating system data from the first memory device, an identification channel consisting of a second group of electrical contact points for communicating the identification data from said definition device, and a programming channel consisting of a third group electrical contact points for providing programming access to the first memory device and the definition device. In another embodiment, the universal memory card further includes an expansion bus within the universal memory bus for communicating data between a memory device subsequently added to the system memory and the central processing unit. When connected to the host system, the X-Card provides the host system a completely accessible, expandable and reconfigurable system memory.

DESCRIPTION OF THE PREFERRED EMBODIMENT

Figure 2:
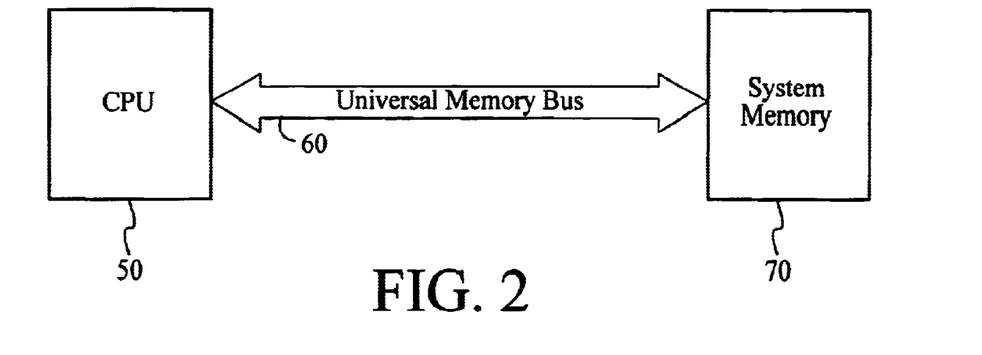
FIG. 2 is the architecture of the universal memory bus in accordance with the present invention.

FIG. 2 shows the architecture of the universal memory bus in accordance with the invention. A CPU 50 is connected to a system memory 70 via the universal memory bus 60 through which data and programming signals flow. The system memory 70 may include different types of parallel and serial memory devices such as EEPROM, FLASH, and RAM memory devices.

I. The Universal Memory Bus

Figure 3:
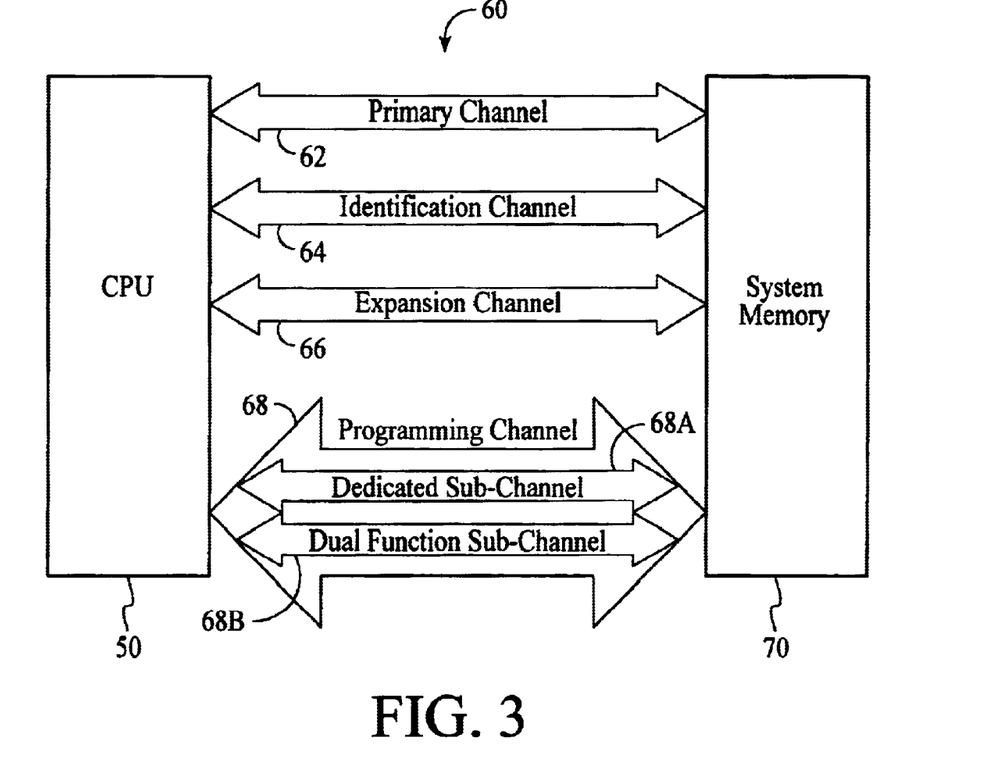
FIG. 3 is the channel architecture of the universal memory bus in accordance with the present invention.

FIG. 3 shows the preferred signal architecture of the universal memory bus 60. The universal memory bus 60 consists of a primary channel 62 for communicating boot data to activate the host system and normal data thereafter, an identification channel 64 for communicating data describing the device composition of the system memory, an expansion channel 66 for providing programming and data access to a memory device subsequently added to the system memory and a programming channel 68 for providing programming access to each programmable memory device within the system memory.

The primary channel 62 is generally comprised of power, address, data, and control lines which are necessary to establish a communication link between the CPU 60 and the system memory 70.

The identification channel 64 is generally composed of data and control lines for communicating identification data which describes the device composition of the system memory 70 to the host CPU 50.

The expansion channel 66 is composed generally of additional data, address and/or programming lines which can be selectively activated to provide address, data, or programming signals to a subsequently added memory device.

The programming channel 68 generally consists of lines which provide programming and control signals necessary to program the serial or parallel programmable memory devices resident within the system memory. In the preferred embodiment, the programming channel consists of a dedicated sub-channel 68A which is active only during programming operations and a dual function sub-channel 68B which communicates programming signals during programming operations while providing address, and or control signals during normal data transfer operations.

Figure 4:
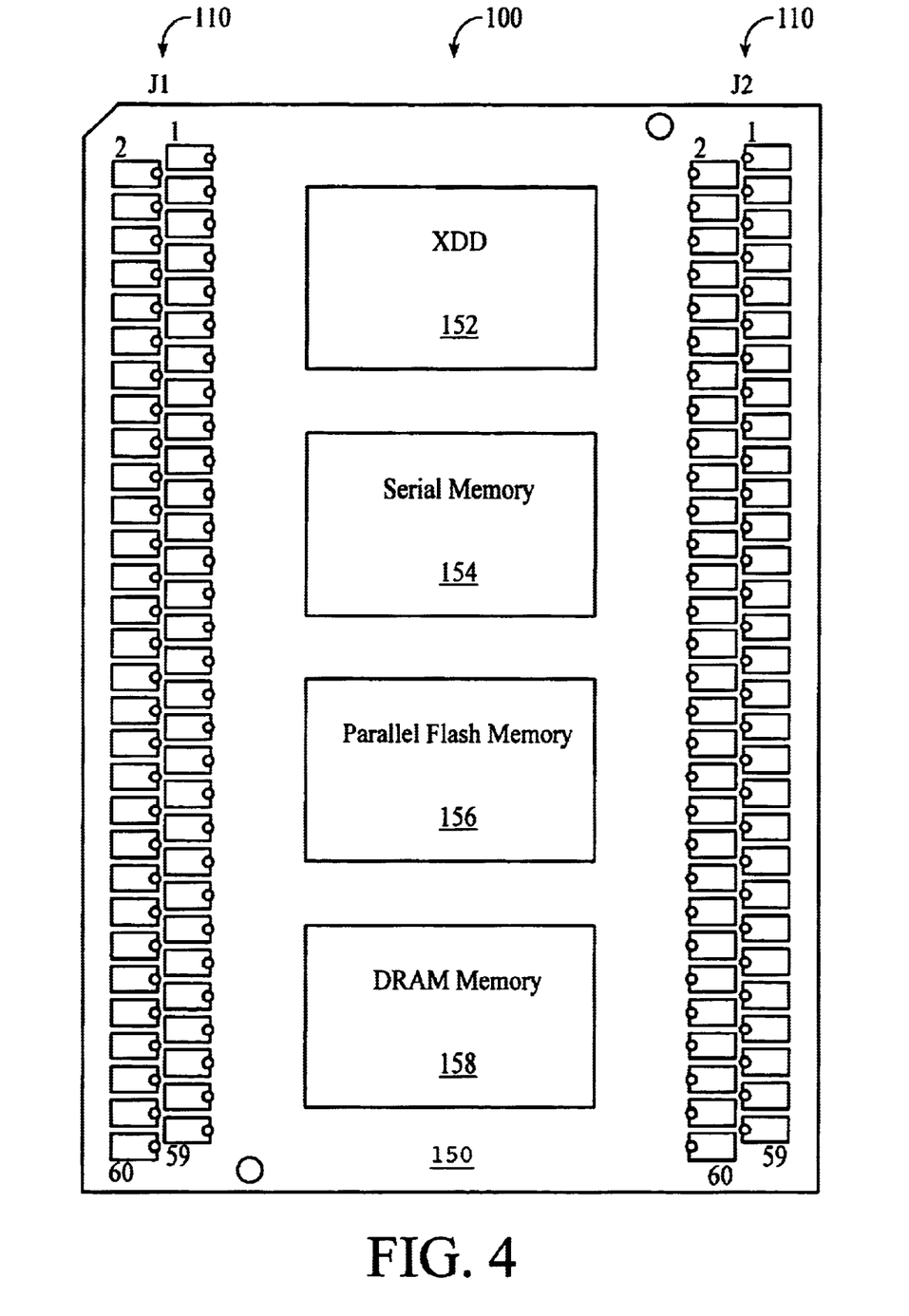
FIG. 4. is a detailed view of the universal memory card in accordance with the present invention.

FIG. 4 shows one embodiment of the universal memory bus as incorporated in a memory card referred herein to as an X-Card 100. The X-Card 100 consists of the universal memory bus 110 and an on-board system memory 150 which functions as the system memory 70 for the host CPU 50. In the preferred embodiment, the on-board system memory 150 includes an X-Card Definition Device (XDD) 152, a serial memory device 154, a parallel memory device 156, and an expansion memory device 158. The XDD device stores data describing the device composition of the on-board system memory 150, and is preferably a serial EEPROM device. In the preferred embodiment, the serial and parallel memory devices 154 and 156 are FLASH memory devices and the extension memory device 158 is a DRAM memory chip.

In its preferred embodiment shown in FIG. 4, the universal memory bus 110 consists of 120 electrical contacts divided into two connection patterns J1 and J2 disposed along the X-Card's major edges. The contact points are divided into the four groups corresponding to the four channels comprising the universal memory bus. Table I lists the electrical contacts and the channel(s) to which the connection is associated.

TABLE I

X-Card Pin Assignments

| X1 Pin | Universal Bus Channel | 16-bit no Ext | 16-bit + Ext | Description |
|---|---|---|---|---|
| 1 | Primary | VCC | | Power |
| 2 | Program | SVPP# | | Serial Program Supply |
| 3 | Program | HLD# | | Serial Hold |
| 4 | Primary | SRST# | | Serial Reset |
| 5 | Program | SWP# | | Serial Write Protect |
| 6–8 | Primary | SA0-2 | | Serial Addr. Select |
| 9–10 | Identify | XD0-1 | | XDD Protocol |
| 11 | Primary | LVSTAT | | Low VCC Status |
| 12–15 | Expansion | RSD0-3 | | Reserved Lines |
| 16–25 | Primary | A0–A9 | | Address Lines |
| 26 | Program Dual Func. | FA9 | | Flash Address Line |
| 27–33 | Primary | A10–16 | | Address Lines |
| 34 | Primary | VCC | | Power |
| 35–43 | Primary | A17–25 | | Address Lines |
| 44 | Primary | RST# | | Reset |
| 45 | Primary | WE# | | Write Line |
| 46 | Primary | GND | | Ground |
| 47 | Program Dual Func. | FEW# | | Flash Write Enable |
| 48–49 | Primary | CE3–4# | | Chip Select |
| 50 | Program Dual Func. | FOE# | | Flash Out Enable |
| 51 | Primary | OE# | | Output Enable |
| 52–54 | Primary | CE0–2# | | Chip Select |
| 55 | Primary | RY/BY# | | Ready/Busy |
| 56 | Program | WP# | | Write Protect |
| 57 | Program | RP# | | Reset/Power Down |
| 58 | Program | 3/5# | | 3V/5V Select |
| 59 | Program | VPP | | Program Supply |
| 60 | Primary | VCC | | Power |
| 61 | Primary | VCC | | Power |
| 62 | Primary | SEN# | | Serial Enable |
| 63–64 | Primary | SCK1-2 | | Serial Clock |
| 65 | Primary | SRY/BY# | | Serial Ready/Busy |
| 66 | Primary | SO | | Serial Out |
| 67 | Primary | SI/SIO | | Serial In/Out |
| 68–70 | Primary | SCE0–2# | | Serial Chip Select |
| 71 | Primary | SCK2 | | Serial Clock 2 |
| 72 | Primary | GND | | Ground |
| 73 | Expansion | RSD7 | WED# | Reserved/WE DRAM |
| 74, 76, 78, 80 | Expansion | RSD8, 10, 12, 14 | DP0–3 | Reserved/Parity Data Lines |
| 75, 77, 79, 81 | Expansion | RSD9, 11, 13, 15 | CS0–3# | Reserved/DRAM CAS |
| 82 | Primary | GND | | Ground |
| 83–86 | Expansion | RSD16–19 | RS0–3# | Reserved/DRAM RAS |

TABLE I-continued

X-Card Pin Assignments

| X1 Pin | Universal Bus Channel | 16-bit no Ext | 16-bit + Ext | Description |
|---|---|---|---|---|
| 87–102 | Primary | D0–15 | | Data Lines |
| 103 | Primary | GND | | Ground |
| 104–119 | Expansion | | RSD20–35 | Reserved Lines |
| 120 | Primary | GND | | Ground |

The operation of the universal memory bus as embodied in the X-Card of Table I will now be described in terms of the primary, identification, programming and expansion channels of the universal memory bus.

A. The Primary Channel

The primary channel of the universal memory bus provides boot data upon system activation and communicates normal data thereafter. The primary channel is composed of serial and parallel power lines, address lines, data lines, and control lines. Table I details the primary channel lines in the preferred embodiment.

In order to provide the signals necessary for the host CPU to boot the system, the X-Card of Table I always uses parallel chip select line CE0# to select the proper parallel device for the boot data. Thus if the host CPU wishes to boot from the parallel lines of the X-Card of Table I, the CPU places the correct boot starting address on the parallel address lines, lowers CE0# and OE#, and reads the data on the parallel data lines. After receiving the first data, the CPU is now able to proceed to read the correct subsequent data from the universal memory bus in order for proper initialization the computer system. Complete proper system initialization may require reading both data from serial and parallel devices and hence the primary signal set of Table 1 includes both parallel and serial signal lines.

Figure 5A:
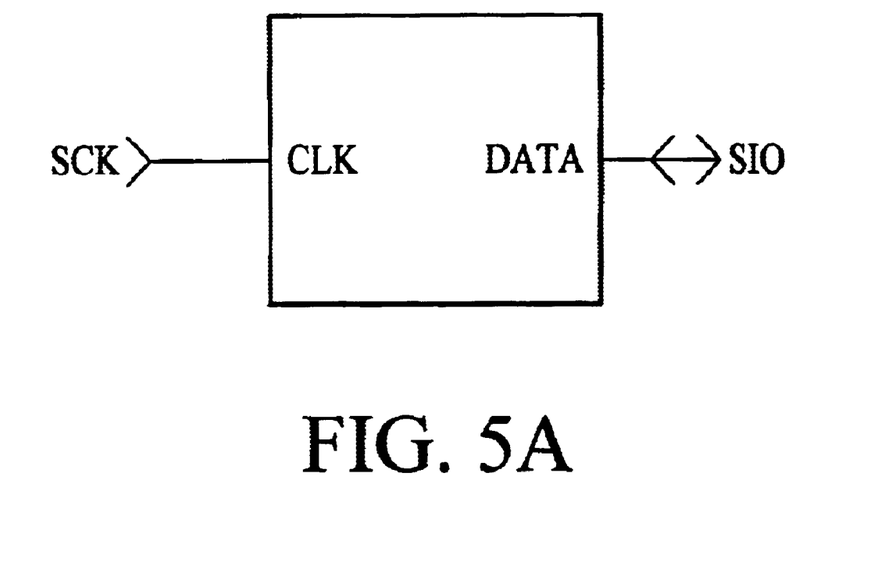
FIG. 5A shows the connection pattern of a standard two wire serial memory device for use in the invention.
Figure 5B:
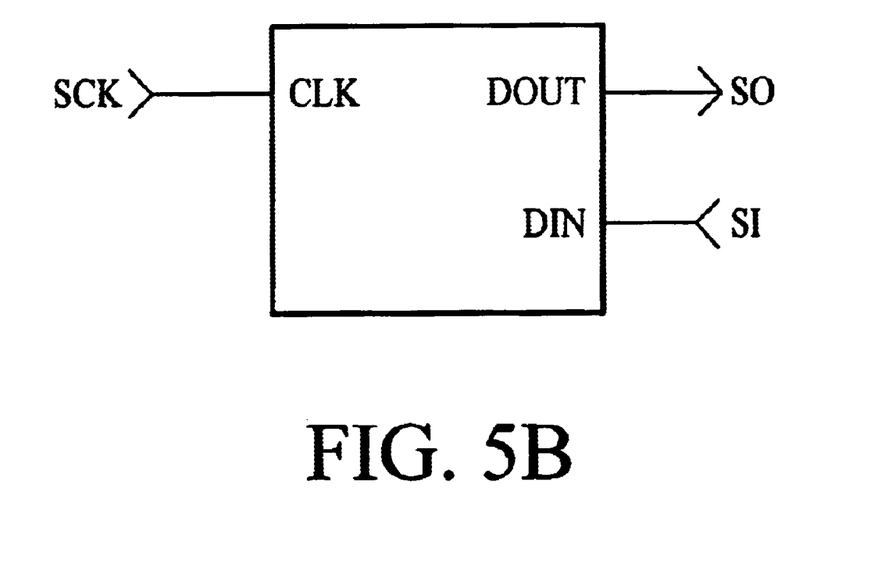
FIG. 5B shows the connection pattern of a standard three wire serial memory device for use in the present invention.

A variety of serial protocols exist, and the universal bus of Table 1 accommodates a wide range of serial protocols by including multiple serial clocks, multiple chip selects, a bi-directional serial data line SIO and a unidirectional serial out line SO. FIG. 5A shows the interface connection for a standard two wire serial memory which uses the serial clock line SCK and a bi-directional data line SIO. FIG. 5B shows the interface connection for a standard three wire serial memory which uses the serial clock is line SCK, a CPU data out line SO, and a CPU data in line SIO. In order for the CPU to know the correct serial protocols to use when communicating over the universal memory, it is necessary for the host CPU to read the data in the XDD device over the identification channel.

B. The Identification Channel The identification channel as described in the X-Card of Table I consists of the XDD protocol lines XD0 and XD1, the serial clock SCK0, the serial data line SIO, and the serial chip select line SCE0#. The two level signal lines XD0 and XD1 inform the CPU which one of four serial interface protocols is supported by the XDD 152. Primary signal lines SA0–2 and SO may also be used depending upon whether the protocol lines XD0 and XD1 indicate a two or three wire serial XDD protocol. Once the serial protocol is known, the host CPU can use the correct serial lines to read the XDD device. In the preferred embodiment, the four possible serial protocols go by the common industry names of the two wire serial protocols I²C and extended I²C; and the three wire serial protocols SPI and extended SPI.

Table II shows the organization of the identification data resident in the XDD device which describes the composition of the on-card system memory 150. The data is organized into blocks, the first of which describes the general characteristics of the X-Card and the XDD device itself. The XDD device is labeled as the X-Card Serial Device 0. The second block corresponds to the decoded memory space that is the Serial Device 1. This ordering continues through all X-Card serial devices. Next are the blocks of information for the parallel devices starting with the memory space enabled by the parallel chip select CE0#, which selects the system primary boot device(s). Following all the parallel devices are the blocks of information for any extension memory devices.

TABLE II

XDD Information Organization

X-Card and XDD
Serial Device Number 1
Serial Device Number 2
. . .
Serial Device Number N
Parallel Device Number 0
Parallel Device Number 1
. . .
Parallel Device Number N
Extension Device Number 0
Extension Device Number 1
. . .
Extension Device Number N Table III lists the information contained in the first block. This data includes 35 bytes which describe the number and size of the system memory devices, device type and clock frequency of the XDD 152, and the operating voltage and part number designation of the X-Card 100. The XDD identification data which describes the individual X-Card memory blocks can be defined in a manner similar to Table III or alternatively stored in an industry standard format such as is common on DRAM modules with serial devices called serial presence detect devices.

TABLE III

X-Card and XDD Information Block

| Byte | Description |
|---|---|
| 0 | Number of Bytes in Block |
| 1 | Total Size of All XDD Data - Upper Byte |
| 2 | Total Size of All XDD Data - Lower Byte |
| 3 | Check sum of All XDD Data - Upper Byte |
| 4 | Check sum of All XDD Data - Lower Byte |
| 5–15 | X-Card Basic Part Number |
| 16–20 | X-Card Extension Part Number |
| 21 | X-Card Maximum VCC voltage in 0.1 volts |
| 22 | X-Card Minimum VCC voltage in 0.1 volts |
| 23 | X-Card Parallel Data Width (8, 16, 32, 64) |
| 24 | Total # of X-Card Memory Spaces |
| 25 | Total # of X-Card Serial Devices |
| 26 | Total # of X-Card Serial Devices using I2C |
| 27 | Total # of X-Card Parallel Devices |
| 28 | Total # of X-Card Extension Devices |
| 29 | Type of XDD Device I2C, ExtI2C, SPI, ExtSPI |
| 30 | Lines Used by XDD (SRST, SWP, SEN, SR/B, SVPP |
| 31 | XDD Max Clock Frequency at Max VCC |
| 32 | XDD Max Clock Frequency at Min VCC |
| 33 | Optional Format Description of XDD Device |
| 34 | N |
| 35–(N − 35) | Area for Optional XDD Device Description |

C. The Programming Channel

The programming channel of the universal memory bus provides programming access to each memory device within the system memory and in the preferred embodiment consists of a dedicated sub-channel 68A and a dual function sub-channel 68B (FIG. 3) The dedicated sub-channel is active only during programming operations. The dual function sub-channel carries control and address information during standard data transfer operations while providing programming signals during programming operations.

During normal data transfer, the dedicated sub-channel is held inactive. In the preferred embodiment, this is accomplished through the use of resistors which sets the dedicated sub-channel lines to an inactive state, such as is shown for lines WP# and RP# in FIG. 6. During programming operations, the resistors 156A and 156B act as pull up resistors only, and the RP# and WP# lines are operated at the signal levels generated by the CPU.

Figure 6:
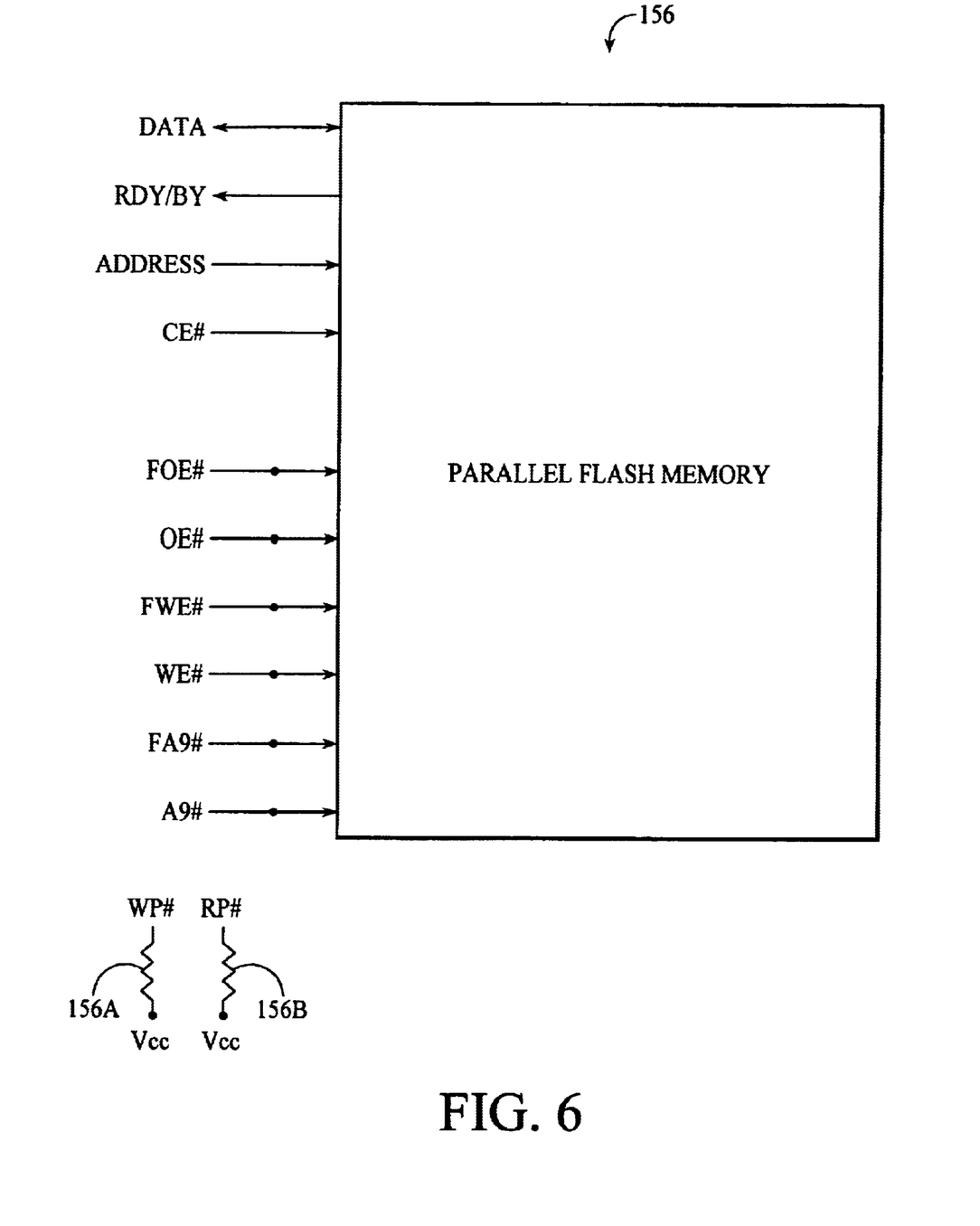
FIG. 6 shows the connection pattern for a parallel FLASH memory device for use in the present invention.

The dual function sub-channel includes the line pairs A9 and FA9, OE# and FOE#, and WE# and FWE# coupled to the FLASH parallel memory 156. In normal data transfer operation, as depicted in FIG. 6, the line pair A9 and FA9 are shorted together to operate as a single address line for the Flash parallel memory chip 156. Similary during normal data transfer operations, the shorted line pairs OE#-FOE# and WE#-FWE# function as the output enable and write enable lines for the Flash memory chip 156, respectively.

During programming operations, the line pairs A9-FA9, OE#-FOE# and WE#-FWE# shown in FIG. 6B are disconnected from each other. This allows special program signal levels to be placed on FA9, FOE# and FEW#. These lines, together with the dedicated sub-channel allow the memory devices to be programmed correctly while still coexisting with other non-programmable memory devices.

D. The Expansion Channel

The expansion channel provides data and programming access to an extension memory devices 158 later added to the on-board system memory 150. In the preferred embodiment described in Table I and shown in FIG. 7, the extension memory consists of DRAM memory devices, and the expansion channel lines include the column chip select lines CAS#0–3, row chip select lines RAS#0–3, a write enable line WED#, and data parity lines DP#0–3.

Figure 7:
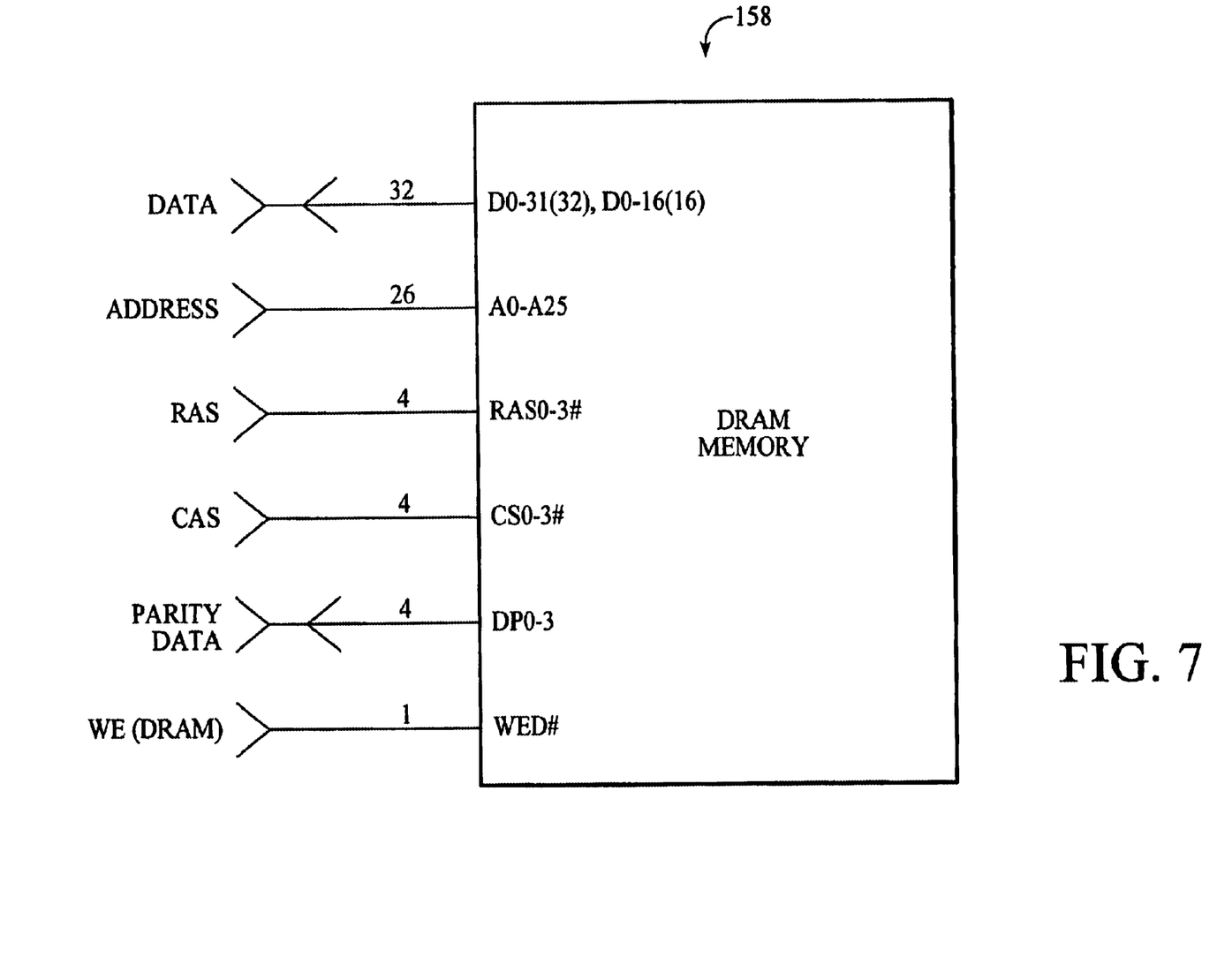
FIG. 7 shows the connection pattern for a DRAM extension memory for use in the present invention.

The combination of the primary channel, programming channel and the expansion channel provides all address, data, programming and control lines needed for operation of extension memory devices. When not actively used, devices connected to the expansion channel are disabled preferably by pull-up resistors which hold these devices in an inactive state.

The X-Card of Table I allows for other types of extension memory devices besides DRAM devices. If these devices require additional connections for data transfer and programming access, they may be allocated from the reserved lines on pins 104–119 of the X-Card.

II. Issues Related to a Universal Memory Card

Tables IV and V list the component makeup of two 16-bit X-Cards with and without memory extensions as described in Table I. The 16-bit X-Card without memory extension (Table I) includes Flash, SRAM and EEPROM devices as parallel memory devices and a Flash memory. The 16-bit X-Card with memory extension (Table II) includes serial flash devices, parallel flash devices, and DRAM memory as the memory extension. The XDD in both embodiments is a serial EEPROM.

TABLE IV

Typical Embodiment of 16-bit X-Card Without Extension

| Memory Type | Memory Size | Part No. (Manuf.) | Quan |
| --- | --- | --- | --- |
| Parallel Flash | 1 Meg × 16 | 28F016SV (Intel) | 1 |
| Parallel SRAM | 128K × 16 | HM628128 (Hitachi) | 2 |
| Parallel EEPROM | 32K × 16 | AT28C256 (Atmel) | 2 |
| XDD | 512 × 8 | AT25C04 (Atmel) | 1 |
| Serial Flash | 8K × 8 | X24F064 (Xicor) | 1 |

TABLE V

Typical Embodiment of the 16-bit X-Card with Extension

| Memory Type | Memory Size | Part No. (Manuf.) | Quan |
| --- | --- | --- | --- |
| Parallel Flash | 512K × 16 | AM29F800 (AMD) | 1 |
| DRAM Extension | 8 Meg × 16 | UPD4217800G5 (NEC) | 2 |
| | | UPD4217800G5R (NEC) | 2 |
| XDD | 512 × 8 | AT25C04 (Atmel) | 1 |
| Serial Flash | 8K × 8 | X24F064 (Xicor) | 1 |

Also preferred are identical universal buses for all X-Cards designed.to processed the same number of parallel bits. For instance, the two X-Cards in Table IV and Table V are assigned the same primary, identification, programming and expansion channel assignments, as shown in Table I. By using this arrangement, the X-Card of Table IV which has a 16-bit SRAM memory space but no extension memory can be interchanged with the X-Card of Table V with DRAM extension memory.

Because X-Cards sharing a common data width but otherwise of different composition may be easily interchanged, X-Card manufacturers can provide a wide range of different memory configurations using the same form factor. This provides the X-Card user with a low cost and adaptable solution to system memory design.

The physical interconnection between the X-Card and the host CPU can be in the form of a fixed solder connection or a removable socket connection. The fixed solder connection provides the most reliable method of card interface but makes field upgrade difficult. Use of removable sockets to connect an X-Card to the system allows for quick upgrade of the system memory at the expense of some system reliability.

Other X-Card configurations other than shown in Table I, IV, and V are of course possible. For instance, the 120 pin of Table I may modified to provide 8 or 32 bit parallel data memory cards, with the 8-bit card requiring the fewest of the 120 connections and the 32 bit card requiring the most.

While the above is a complete description of the preferred embodiments of the invention, various alternatives, modifications and equivalence may be used. Therefore, the above description should not be taken as limiting the scope of the invention which is defined by the metes and bounds of the appended claims.

What is claimed is:

1. A universal memory card for providing a system memory to a host system, the universal memory card comprising:
    an on-card system memory, said on-card system memory comprising:
        a first memory device for storing system data;
        a definition device for storing identification data describing the device composition of said on-card system memory; and a single memory bus directly coupled between the system memory and the host system comprising:
  a primary channel for communicating said system data from said first memory device to said host system;
  an identification channel for communicating said identification data from said definition device to said host system; and
  a programming channel for providing programming access to said first memory device and to said definition device; the programming channel further comprising one or more dual function sub-channel lines configured to communicate a programming signal to said first, memory device when said directly coupled memory bus operates in a programming mode and to communicate a data transfer signal to said first memory device when said directly coupled memory bus operates in a data transfer mode.

2. The universal memory card of claim 1, wherein said identification data includes the memory size and memory type of said first memory device and said definition device.

3. The universal memory card of claim 1, wherein said on-card system memory further comprises a memory extension device for providing an increased on-card memory capacity, and said single memory bus further comprises an expansion channel for providing data and programming access to said memory extension device.

4. The universal memory card of claim 3, wherein said first memory device is a FLASH parallel memory device, said definition device is a serial EEPROM device, and said memory extension device is a DRAM memory device.

5. In an electronic system having a central processing unit for accessing information stored on a memory card, a reconfigurable memory comprising:
  a memory port; and
  a reconfigurable memory card coupled to said first memory port for providing a system memory to said electronic system, said reconfigurable memory card comprising:
    an on-card system memory, said on-card system memory comprising:
      a first memory device for storing system data;
      a definition device for storing identification data describing the device composition of said on-card system memory; and
    a single memory bus directly coupled, between the system memory and the host system comprising:
      a primary channel for communicating said system data from said first memory device;
      an identification channel for communicating said identification data from said definition device;
      a programming channel for providing programming access to said first memory device and said definition device; the programming channel further comprising one or more dual function sub-channel lines configured to communicate a programming signal to said first memory device when said directly coupled memory bus operates in a programming mode and to communicate a data transfer signal to said first memory device when said directly coupled memory bus operates in a data transfer mode.

6. The reconfigurable memory of claim 5, wherein said on-card system memory further comprises a memory extension device for providing an increased on-card memory capacity, and said single memory bus further comprises an expansion channel for providing data and programming access to said memory extension device.

* * * * *